United States Patent [19]

Ahmad et al.

[11] Patent Number: 5,152,951
[45] Date of Patent: Oct. 6, 1992

[54] VENTED TIRE MOLD AND METHOD FOR VACUUM MOLDING

[75] Inventors: Shamim Ahmad, North Canton; Donald R. Bartley, Cuyahoga Falls; John P. Czarnecki, Uniontown, all of Ohio

[73] Assignee: The Uniroyal Goodrich Tire Company, Akron, Ohio

[21] Appl. No.: 558,378

[22] Filed: Jul. 27, 1990

[51] Int. Cl.$^5$ .............................. B29C 33/10
[52] U.S. Cl. .................. 264/502; 264/102; 425/28.1; 425/812
[58] Field of Search .............. 425/28.1, 35, 37, 420, 425/812, 405.1; 264/326, 328.9, 501, 102, 502; 249/141; 156/87, 394.1

[56] References Cited

U.S. PATENT DOCUMENTS

| | | | |
|---|---|---|---|
| 1,880,430 | 10/1932 | Furnas | 425/28.1 |
| 4,447,197 | 5/1984 | Bartley et al. | 425/28.1 |
| 4,573,894 | 3/1986 | Blayne et al. | |
| 4,662,833 | 5/1987 | Carter | 425/28.1 |
| 4,812,281 | 3/1989 | Beard et al. | 425/28.1 |
| 4,881,881 | 11/1989 | Rockarts et al. | |

Primary Examiner—Geoffrey L. Knable
Attorney, Agent, or Firm—Greg Strugalski; Alan A. Csontos

[57] ABSTRACT

In a tire mold having a pair of mold parts separable about cooperating surfaces of the respective mold parts which define a parting line region, each of the mold parts includes a surface defining at least a portion of a cavity for shaping a tire. The tire mold further includes a plurality of pockets for defining a respective plurality of circumferentially arranged tread elements in the tire. The improvement comprises a vacuum source in fluid communication with the cavity of the tire mold for evacuating fluid from the cavity in the tire mold through a space located between the surfaces of the mold parts which define the parting line region. A vent fluidly connects a pair of adjacent pockets. A passage associated with one of the mold parts provides fluid communication between the vacuum source and one of the pair of adjacent pockets connected by the vent.

11 Claims, 5 Drawing Sheets

VENTED TIRE MOLD AND METHOD FOR VACUUM MOLDING

BACKGROUND OF THE INVENTION

1. Technical Field

The present invention relates to a tire mold, to a method for molding a tire and to a resulting vehicle tire. In particular, the present invention relates to improvements in vacuum molding the tire.

2. Description of the Prior Art

Vacuum molding a tire is known. U.S. Pat. No. 4,573,894 discloses a tire mold having a cavity for receiving and shaping the tire. The cavity is defined by a surface for contacting the exterior of the tire during a tire curing cycle. The cavity is fluidly connected with a vacuum source for evacuating fluid from within the cavity during the early portion of a tire curing cycle. This evacuation process prevents fluid from becoming trapped between the tire and the surface defining the cavity. Visual defects in the form of voids in the tire exterior are, thus, eliminated. Furthermore, optimal curing contact between the surface defining the cavity and the exterior of the tire results. The advantages of such a vacuum molding system are recognized and are evidenced by the increasing use of vacuum molding in the tire curing art.

A tire mold cavity typically includes a plurality of projections which define pockets in the mold. The pockets form ground engaging tread elements about the outer circumference of the tire. U.S. Pat. No. 4,881,881 discloses an improvement to the vacuum molding system by venting laterally or circumferentially adjacent pockets through specially shaped arch-vent passages formed in the projections. Fluid may communicate between adjacent pockets and then to the vacuum source so the fluid does not become trapped in a pocket. Thus, a ground engaging tread element free from visual defects is provided by the use of arch-vent passages in the vacuum molding system.

Venting through an arch-vent passage has proved advantageous in a tire production environment. However, the use of the arch-vent passage has practical limitations. On a tire having a groove wider than approximately one-half inch, problems may arise during removal of the cured tire from the tire mold. Such a relatively wide groove is often found extending circumferentially on a performance tire or a light truck tire. The problem arises because an arch-vent remnant formed by cured rubber extending into the arch-vent passage may be sheared off during removal of the cured tire from the mold. This is a particular problem when the arch-vent passage is located in or near a plane extending radially of the tire.

The sheared-off arch-vent remnant then may fall into the bottom of the cavity in the tire mold. The arch-vent remnant then is cured into the subsequent tire that is placed in the tire mold which results in a visual defect referred to as a blemish. Thus, it will be apparent that it is desirable to produce a tire without any arch-vent remnants extending across such relatively wide and circumferentially extending groove in a tire.

SUMMARY OF THE INVENTION

The present invention is directed to an improved tire mold and to an improved method for vacuum molding a tire that is free from arch-vent remnants in circumferentially extending grooves in the tire. In a tire mold embodying the present invention, a pair of mold parts are separable about cooperating surfaces of the respective mold parts. The cooperating surfaces define a parting line region. Each of the mold parts also includes a surface defining a portion of a cavity for receiving and shaping an uncured tire. Each of the mold parts further includes a plurality of circumferentially arranged pockets associated with the cavity and which define a plurality of circumferentially arranged ground engaging tread elements on the tire.

The improvement to the tire mold of the present invention comprises vacuum means in fluid communication with the cavity of the tire mold. The vacuum means evacuates fluid from the cavity in the tire mold through a space located between the cooperating surfaces of the respective mold parts. Vent means fluidly connects a pair of circumferentially adjacent pockets. Passage means is associated with one of the mold parts. The passage means provides fluid communication between the vacuum means and one of the pair of circumferentially adjacent pockets which are connected by the vent means.

In a preferred embodiment of the invention, the tire mold is separable at a location adjacent the mid-circumferential plane of the tire into a pair of mold halves. The passage means comprises a plurality of passages communicating the vacuum means with the respective pockets. The plurality of passages are spaced a substantially equal amount from one another circumferentially about the tire mold halves. The passage means further comprises at least one blind passage formed in a mold half by a pair of drilled openings intersecting at an angle of between 45° and 135°. The vent means comprises an arch-vent passage. A restrictor plug is located in an end portion of the passage means adjacent the cavity.

The method of molding a tire embodying the present invention comprises providing a tire mold separable into mold halves about cooperating surfaces defining a parting line region. The tire mold includes a surface defining a cavity and a plurality of circumferentially arranged pockets for forming a plurality of ground engaging tread elements in the tire. Fluid is evacuated from the cavity through a chamber at least partially defined by the cooperating surfaces of the mold halves. A pair of circumferentially adjacent pockets are fluidly connected through an arch-vent passage. One of the pair of circumferentially adjacent pockets connected by the arch-vent passage is fluidly connected with the chamber.

The tire embodying the present invention includes a molded tread portion. The tread portion includes a pair of circumferentially extending ground engaging rib portions. At least one of the rib portions comprises a plurality of circumferentially arranged tread elements. Surface means defines a substantially continuous circumferentially extending groove located between the rib portions. A broken arch-vent remnant is located between a pair of circumferentially adjacent tread elements. The arch-vent remnant was formed during a tire molding operation by uncured elastomeric rubber flowing into a vent passage connecting the pair of circumferentially adjacent tread elements. The elastomeric material then cured. The cured material in the vent passage breaks during removal of the tire from the tire mold. The circumferentially extending groove in the tread portion is free of any arch-vent remnants.

The present invention further includes a method of removing a plugged vent passage restrictor located in a first end portion of a blind vent passage. The method comprises the steps of introducing a substantially incompressible fluid into the vent passage through an unplugged second end portion of the vent passage. A tool of a slightly smaller cross-section than the cross-section of a second end portion of the vent passage is placed into the second end portion of the vent passage. The tool contacts the fluid. The tool is advanced to transmit sufficient force through the fluid to the plugged vent passage restrictor to then push the restrictor from the first end portion of the vent passage.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
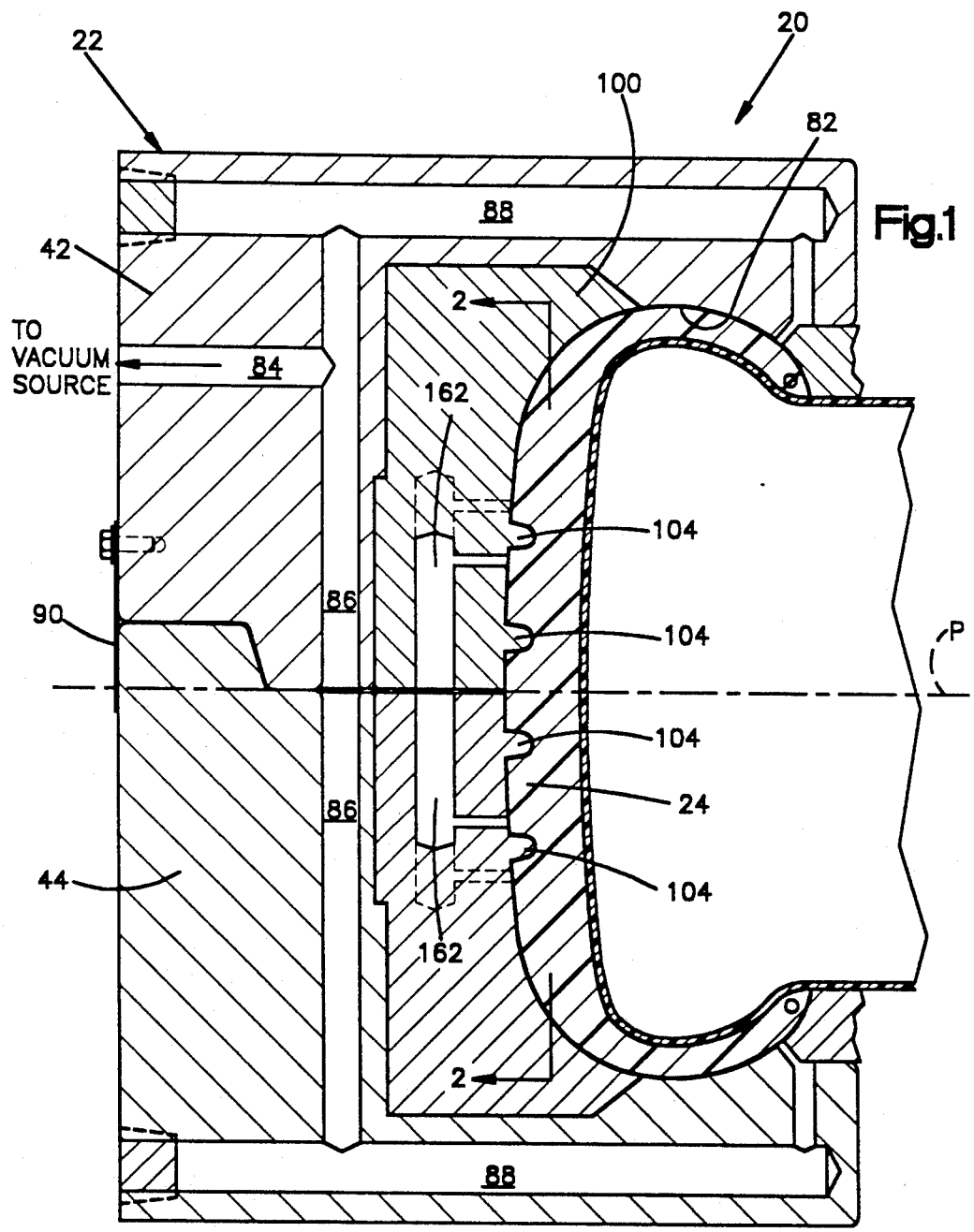
FIG. 1 is a cross-sectional view of a portion of a tire mold embodying the present invention.

A vacuum molding system 20 embodying the present invention for molding an elastomeric article, such as a tire, is illustrated in FIG. 1. The vacuum molding system 20 includes a tire mold 22 for curing the tire 24. The tire mold 22 is operatively connected with a vacuum source (not shown) through suitable piping. The operation of the vacuum molding system 20 is disclosed in U.S. Pat. No. 4,573,894, the specification of which is incorporated herein by reference.

The tire mold 22 is a two piece type of mold. It will be apparent that other types of tire mold may equally embody the features of the present invention. The tire mold 22 includes upper and lower mold halves 42,44. The upper mold half 42 includes a lowermost surface 62 (best seen in FIG. 3). The lower mold half 44 includes an uppermost surface 64.

Together, the surfaces 62,64 cooperate with each other to at least partially define a closed chamber 66. The mold half 44 includes a register surface 68 which projects approximately 0.050 inch from the uppermost surface 64. The register surface 68 engages the lowermost surface 62 to space apart the lowermost surface 62 from the uppermost surface 64 about 0.050 inch. A plurality of grooves 72 (only one shown) of approximately 0.025 inch are machined in the register surface 68. Thus, the surfaces 62,64 are spaced a slight distance apart as viewed in FIG. 3, when the tire mold 22 is fully closed to define the chamber 66. The surfaces 62,64,68 also define a parting line region about which the tire mold halves 42,44 are separable. The parting line region extends in a direction substantially parallel to the mid-circumferential plane P of the tire 24.

The tire mold halves 42,44 include surfaces which define a cavity 82 (FIG. 1) for receiving and shaping the uncured tire 24. The grooves 72 and chamber 66 are in fluid communication with the cavity 82 because the grooves terminate in the cavity. A series of passages 84,86,88 are formed in the tire mold 22. The passages 84,86,88 are in fluid communication with the vacuum source.

The passage 86 in the upper mold half 42 fluidly connects the chamber 66 with the vacuum source. Thus, the cavity 82 is in fluid communication with the vacuum source. An elastomeric seal 90 is attached to the mold half 42 and defines the remainder of the chamber 66. The seal 90 effectively closes off the chamber 66 and cavity 82 from the atmospheric pressure immediately adjacent the exterior of the tire mold 22. Thus, as the mold is being closed or is closed, vacuum from the vacuum source can be applied efficiently to the chamber 66, the grooves 72 and the cavity 82.

Figure 6:
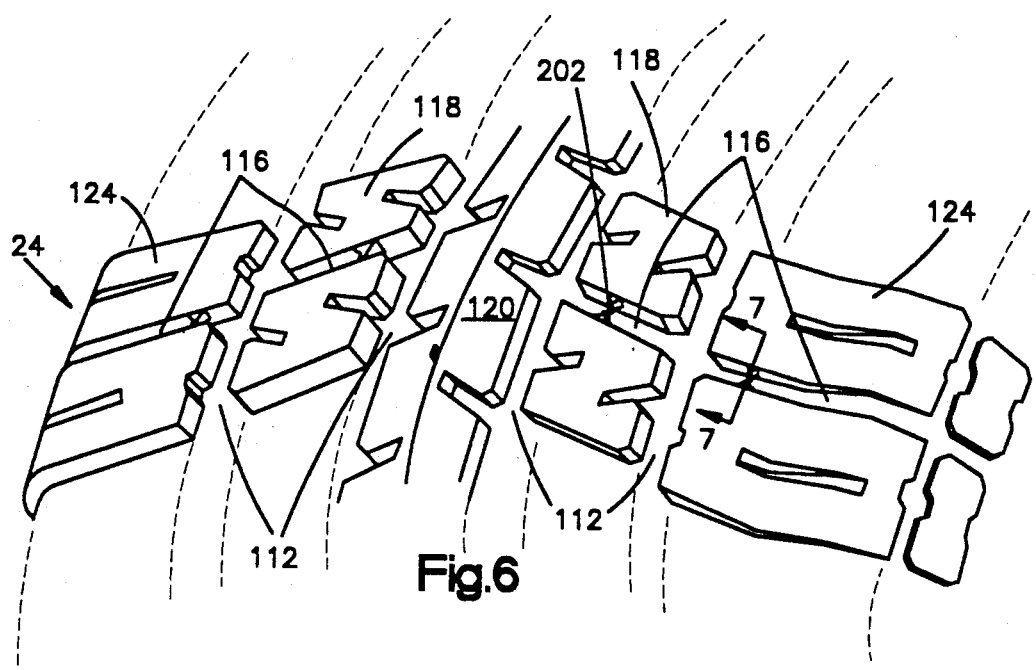
FIG. 6 is a partial perspective view of a portion of a tire formed in the mold embodying the present invention.

The tire mold 22 also includes a tread ring 100 for forming a tread in the tire 24. The tread ring 100 includes a plurality of projections 104,106 (FIGS. 1, 2 and 3) which define grooves in the tread of the tire 24 at a location other than at the parting line of the tire mold 22. Four projections 104 are illustrated, but it will be apparent that any number of projections may be used depending on the desired tread pattern of the tire 24. The projections 104 define circumferentially extending grooves 112 (FIG. 6) in the tire 24. The axially innermost grooves 112 of the tire 24 define a circumferential and substantially continuous ground engaging central rib 120 in the tread.

The projections 106 (FIG. 2) define transversely extending grooves 116 in the tire 24. Cooperating projections 104,106 define a plurality of pockets 108,122 (FIG. 2) in the tread ring 100. Each pocket 108 defines a respective ground engaging tread element 118 (FIG. 6) on the tire 24. Each pocket 122 defines a respective ground engaging tread element 124 on the tire 24. A plurality of circumferentially arranged pockets 108,122 are located in the tread ring 100 to define a respective plurality of circumferentially extending ground engaging tread elements 118,124.

A central pocket 114 (FIGS. 2 and 3) is provided in the tire mold 22 to define a continuous circumferentially extending rib 120 (FIG. 6) on the tire 24. The central pocket 114 of the tire mold 22 is continually in fluid communication with the chamber 66. Thus, virtually all fluid in the central pocket 114 may be removed during the evacuation cycle.

Figure 4:
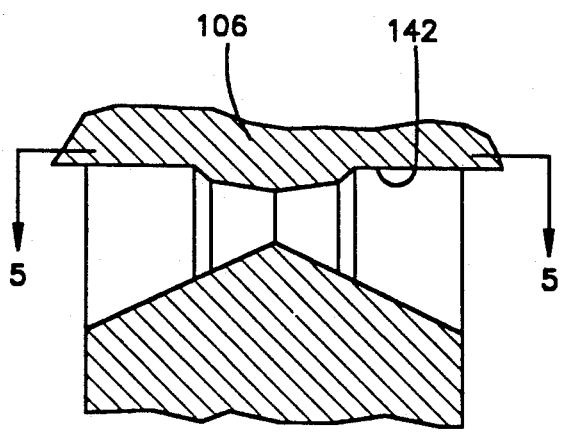
FIG. 4 is an enlarged side view of an arch-vent of the tire mold in FIG. 2, taken approximately along line 4—4 in FIG. 2.
Figure 5:
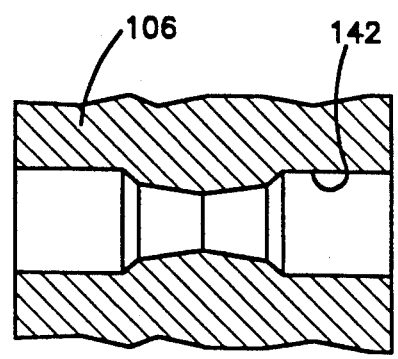
FIG. 5 is a plan view of the arch-vent illustrated in FIG. 4, taken along approximately line 5—5 in FIG. 4.

In order to fluidly connect circumferentially adjacent pockets 108 or 122, an arch-vent passage 142, as illustrated in FIGS. 4 and 5, is provided. The use and design of the arch-vent passage 142 is disclosed in U.S. Pat. No. 4,881,881, the specification of which is incorporated herein by reference. Preferably, each pair of circumferentially adjacent pockets 108 or 122 in the tread ring 100 is fluidly connected by a respective arch-vent passage 142, as illustrated in FIG. 2.

Figure 2:
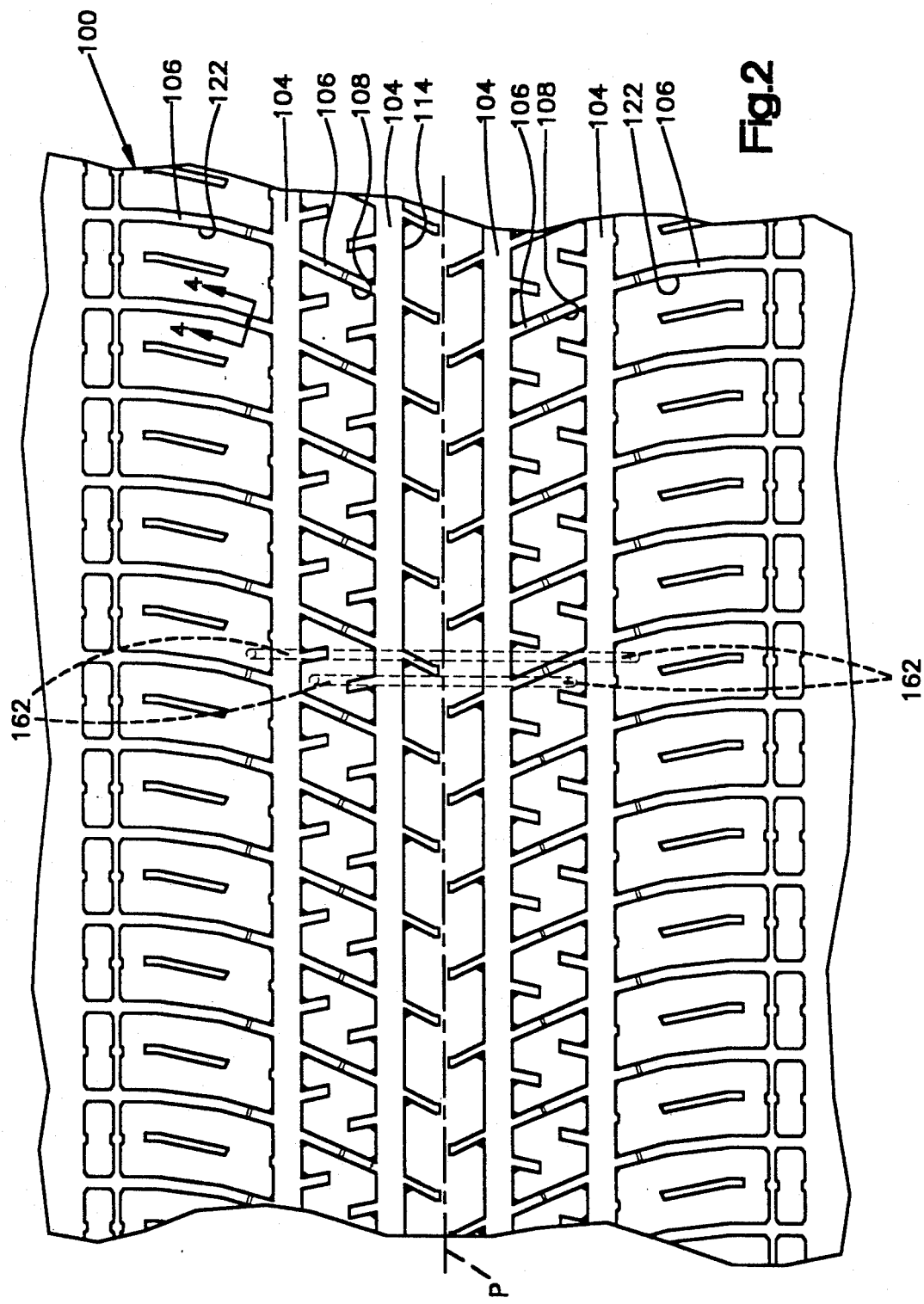
FIG. 2 is a panoramic view of a portion of the tire mold in FIG. 1, taken approximately along line 2—2 in FIG. 1.
Figure 3:
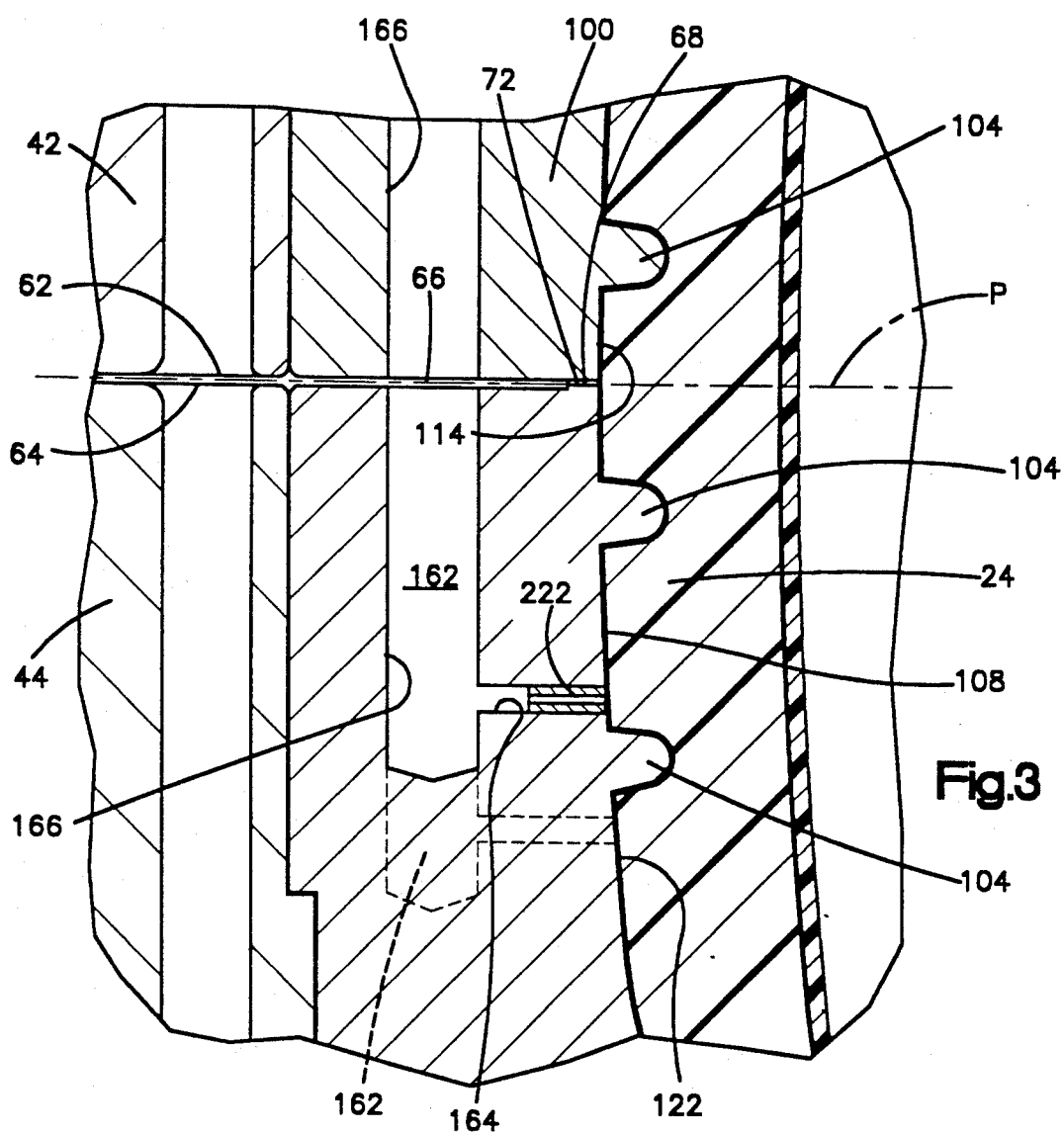
FIG. 3 is an enlarged view of a portion of the tire mold in FIG. 1.

The tire mold 22 also includes a plurality of fluid passages 162 (FIGS. 2 and 3). The passages 162 fluidly connect each circumferentially arranged pocket 108,122 of the cavity 82 with the chamber 66 and, thus, the vacuum source. Preferably, there are at least four fluid passages 162 which are circumferentially spaced substantially equidistant about the tire mold 22 for each circumferentially arranged plurality of pockets 108 or 122.

The fluid passage 162 is a "blind" passage. A "blind" passage is defined herein as including a straight passage 164 drilled from the cavity 82 radially outwardly of the tire mold 22. Another straight passage 166 is drilled through the surface 62,64, respectively, to intersect the passage 164 at an angle of approximately between 45° and 135°. In the illustrated embodiment, the passages 164,166 intersect at essentially a right angle. While just the lower mold half 44 is illustrated in detail as having passages 162,164,166 formed therein, it should be apparent that the upper mold 42 has similar passages.

During the tire molding operation, vacuum is applied to the passages 84 and 86. The chamber 66 and grooves 72 fluidly communicate the passage 86 with the passage 162 so vacuum can also be applied to each pocket 108,122 in the cavity 82. Since each plurality of circumferentially arranged pockets 108 or 122 is fluidly connected by an arch-vent passage 142, all of the pockets are evacuated.

The fluid passage 162 enables the evacuation of fluid from each pocket 108,122. The fluid passage 162 eliminates the need for an arch-vent passage fluidly connecting any pair of laterally adjacent pockets 108 and 122. Thus, the tire mold 22 does not require an arch-vent passage to extend through the projections 104 which define the circumferentially extending grooves 112 in the tire 24.

As a result, the tire 24 has no broken arch-vent remnants remaining in any circumferential groove in the tread of the tire 24. A broken arch-vent remnant 202 (FIG. 7) occurs when uncured elastomeric material flows into an arch-vent passage 142 during a tire molding operation. The elastomeric material located in the arch-vent 142 then cures. During removal of the tire 24 from the tire mold 22, the cured elastomeric material in the arch-vent passage 142 breaks. A tire 24 free of arch-vent remnants in the circumferentially extending grooves not only enhances the appearance of the tire 24 but enables the vacuum molding of tires with relatively wide grooves.

Figure 7:
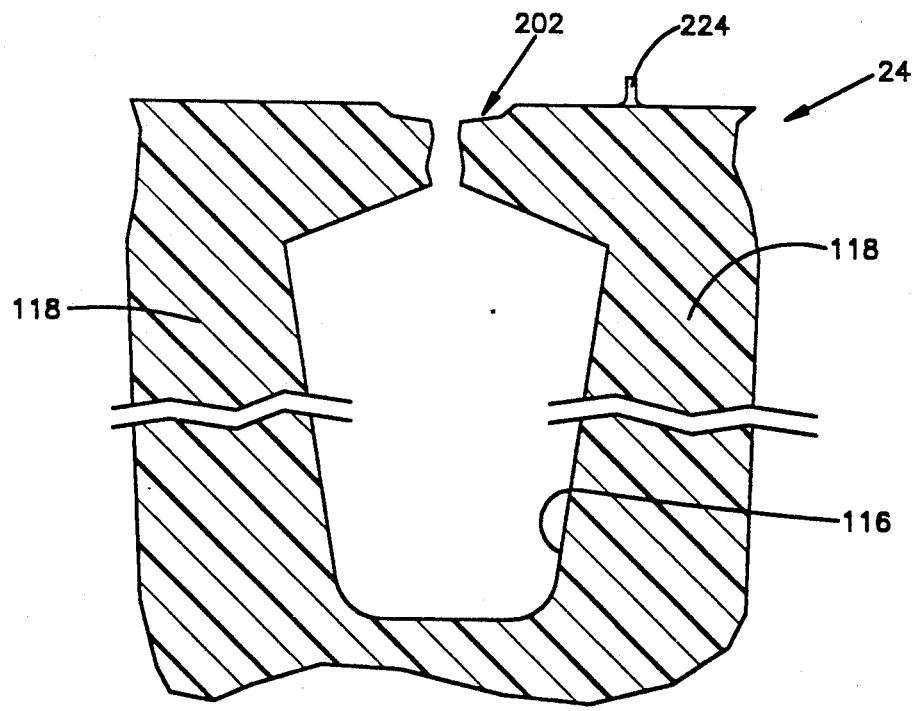
FIG. 7 is a cross-sectional view of a portion of the tire illustrated in FIG. 6, taken approximately along line 7—7 in FIG. 6.

A restrictor plug 222 (FIG. 3) is located in the end of the passage 164 adjacent the cavity 82. The restrictor plug 222 merely reduces the flow area that uncured elastomeric material may flow into. A small amount of elastomeric material cures in the restrictor plug 222 to form a vent projection 224 (FIG. 7). The presence of only a few circumferentially spaced vent projections 224 extending from the tire 24 does not detract from the overall appearance of the tire. The few vent projections 224 may be readily removed if desired.

It is known in the tire curing industry that vent passage restrictor plugs 222 sometimes become clogged with cured rubber. Formerly, restrictor plugs were used only in straight passages. It is generally possible to contact a clogged restrictor plug with a tool inserted through the straight passage in the back of the mold and force out the clogged restrictor plug. However, it will be apparent with the blind passage arrangement embodying the present invention, it is virtually impossible to directly contact a clogged restrictor plug with a suitable tool.

Figure 8:
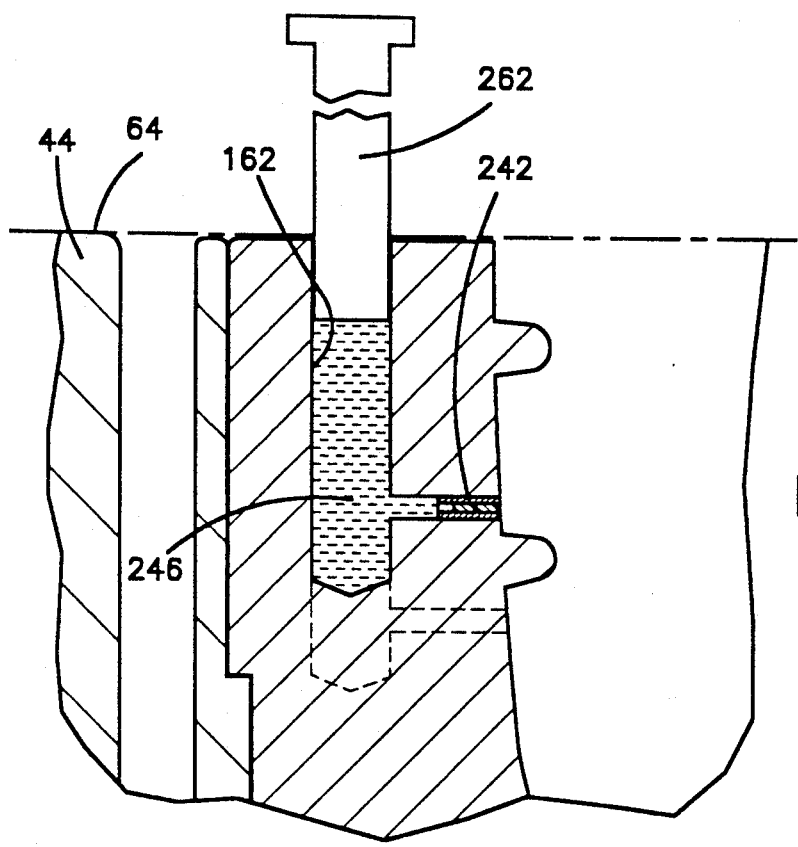
FIG. 8 is a view similar to FIG. 3, illustrating a plugged vent passage restrictor.

Thus, in order for the present invention to be successfully applied to a tire production environment, a method has been devised to remove a clogged restrictor plug from a mold embodying the present invention. To remove a clogged vent passage restrictor plug 242 (FIG. 8) from the mold half 44, an incompressible fluid, such as oil 246, is placed in the passage 162 associated with the clogged restrictor plug. It may be necessary to reorient the mold half 44 in order to accomplish the effective filling of the passage 162 with oil 246. The clogged vent plug restrictor 242 is contacted by the oil 246. The oil 246 is preferably used in such quantity that the oil substantially fills at least half the volume of the passage 162.

Figure 9:
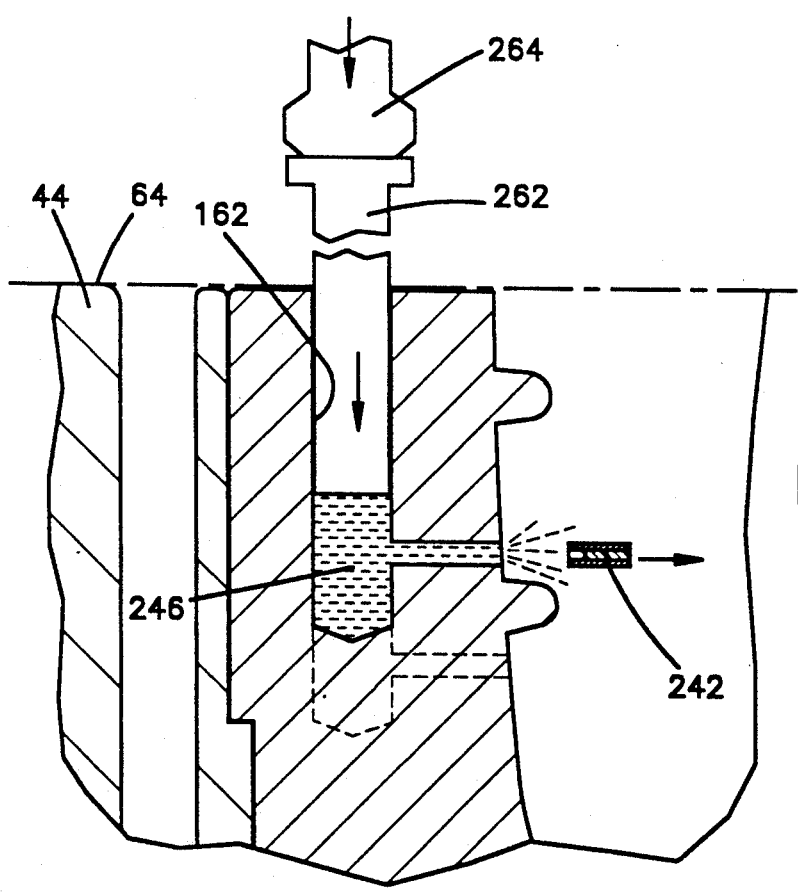
FIG. 9 is a view similar to FIG. 8, illustrating removal of the plugged vent passage restrictor from the vent passage.

A tool 262 (FIG. 9) having a piston like function is then inserted into the unclogged end of the passage 162 at a location away from the clogged restrictor plug 242. The tool 262 is then advanced in the passage 162 to pressurize the oil 246. The tool is advanced with sufficient force such as by the impact of a hammer 264, so that the oil 246 develops a relatively high fluid pressure within the passage 162. The fluid pressure is transferred to the clogged restrictor plug 242 through the oil 246. When the fluid pressure in the oil 242 increases to a sufficiently high level within the passage 162, the restrictor plug 242 is forced out of the passage portion 164.

Care must be taken that the clogged restrictor plug 242 does not shoot out of the passage portion 164 like a projectile. A rag is preferably placed over the clogged restrictor plug 242 to exert sufficient stopping force on the freed restrictor plug 242. A new restrictor plug may then be placed in the passage portion 164 and the tire mold 22 can be placed back into production.

From the above description of preferred embodiments of the invention, those skilled in the art will perceive improvements, changes and modifications. Such improvements, changes and modifications within the skill of the art are intended to be covered by the appended claims.

Having described a preferred embodiment of the present invention, we claim:

1. In a tire mold having a pair of mold halves separable about cooperating surfaces which define a parting line region extending substantially parallel to the mid-circumferential plane of the tire mold; the tire mold includes a surface defining a cavity for shaping a tire, at least one projection for defining a continuous circumferential groove in the tire at a location other than at the parting line region and a plurality of circumferentially arranged pockets located on a side of the projection opposite the parting line region to define a plurality of ground engaging tread elements in the tire, wherein the improvement comprises:

chamber means at least partially defined by the surfaces defining the parting line region and being in fluid communication with cavity;

vacuum means in fluid communication with said chamber means for evacuating fluid from the cavity in the tire mold;

vent means for fluidly connecting together only a pair of circumferentially adjacent pockets located on the side of the projection opposite the parting line region; and passage means providing fluid communication between said chamber means and the pair of circumferentially adjacent pockets connected by said vent means so the circumferential groove formed in the tire by the projection is free from bridge vent remnants.

2. The tire mold set forth in claim 1 wherein said passage means includes a plurality of passages communicating said chamber means with respective pockets, said plurality of passages being circumferentially spaced about the tire mold.

3. The tire mold set forth in claim 1 wherein said passage means comprises at least one blind passage formed in a mold half by a pair of machined openings in the mold half and which openings intersect at an angle in the range of 45° to 135°.

4. The tire mold set forth in claim 1 further including restrictor plug means located in an end portion of said passage means adjacent the cavity.

5. The tire mold set forth in claim 1 wherein said vent means comprises an arch-vent.

6. A tire mold separable into a pair of mold halves about cooperating surfaces defining a parting line region located proximate to a mid-circumferential plane of the tire mold, each of the mold halves including a surface for defining a portion of a cavity for receiving a tire to be cured, said tire mold comprising:

a projection extending from one of the mold halves into the cavity for defining a continuous circumferential groove in a tire and being axially spaced from the parting line region;

a plurality of circumferentially arranged pockets in one of the mold halves for defining a plurality of ground engaging tread elements, said pockets being located on an axially opposite side of said projection from the parting line region;

vacuum means for evacuating fluid from the cavity between the cooperating surfaces of the mold halves;

vent means for fluidly connecting together only a pair circumferentially adjacent pockets located on the axially opposite side of said projection from the parting line region; and passage means providing fluid communication between said vacuum means and one of said pair of circumferentially adjacent pockets connected by said vent means so the circumferential groove in a tire formed by said projection in said tire mold is free from bridge vent remnants.

7. The tire mold set forth in claim 6 wherein said passage means includes a plurality of passages communicating said chamber means with respective pockets, said plurality of passages being circumferentially spaced about the tire mold.

8. The tire mold set forth in claim 6 wherein said passage means comprises at least one blind passage formed in a mold half by a pair of machined openings intersecting at an angle in the range of 45° to 135°.

9. The tire mold set forth in claim 6 further including restrictor plug means located in an end portion of said passage means adjacent the cavity.

10. The tire mold set forth in claim 6 wherein said vent means comprises an arch-vent.

11. A method of molding a tire, said method comprising the steps of:

providing a tire mold separable into mold halves about cooperating surfaces defining a parting line region, the tire mold includes a surface defining a cavity, a projection extending from one of the mold halves into the cavity for defining a continuous circumferential groove in a tire and being axially spaced from the parting line region and a plurality of circumferentially arranged pockets for defining a plurality of ground engaging tread elements, a pair of the circumferentially adjacent pockets located on a side of the projection opposite the parting line region are connected through a vent passage, one of the pair of circumferentially adjacent pockets connected by the vent passage is fluidly connected by a passage to a chamber at least partially defined by the cooperating surfaces of the mold halves;

placing an uncured tire in the cavity of the mold;

pressing the uncured tire against the surface defining the cavity;

evacuating fluid from the cavity through the chamber to permit uncured elastomeric material to flow into the vent passage;

curing the tire; and removing the cured tire from the mold to break the arch vent remnants in the vent passage connecting the circumferentially adjacent pockets and to yield a vacuum molded tire in which the circumferential groove formed by the projection is free from bridge vent remnants.

* * * * *